March 31, 1959  J. D. RECTOR  2,880,329
FADING ELECTRICAL CIRCUIT

Filed March 30, 1956  2 Sheets-Sheet 2

INVENTOR.
JACK D. RECTOR
BY Moody and Goldman
ATTORNEYS 2,880,329
Patented Mar. 31, 1959

2,880,329

FADING ELECTRICAL CIRCUIT

Jack D. Rector, Cedar Rapids, Iowa, assignor to Collins Radio Company, Cedar Rapids, Iowa, a corporation of Iowa Application March 30, 1956, Serial No. 575,116

7 Claims. (Cl. 307—43)

This invention relates generally to means for controlling transient effect during switching operations.

In particular, the invention provides means for avoiding an abrupt change, when switching is provided from one function to another function. The second function may be independent of the first function.

Some types of servo systems utilize a plurality of inputs, which may be sequentially selected at random by an operator to control the servo system. An autopilot is an example of one such type of servo system wherein the operator (pilot) may randomly select among several different types of inputs such as gyro control, omnirange control, glide-slope control and manual operation.

In autopilot use, the transient effects which occur in switching from one type of control to another can have undesirable effects upon the control of the aircraft. They may cause a sudden and undesirable lurch in aircraft attitude since the waveform of the transient may be considerably different from either the previous or the newly selected control function.

It is, therefore, the principal object of this invention to provide means for obtaining a smooth and slow transition from one type of control signal to another type of control signal.

The invention provides a memory circuit which remembers a first signal while a second signal is replacing the first signal. An electronic switch connects the selected input signal to the memory circuit. The electronic switch is quickly opened when switching occurs from a first signal to a second, and during the period of the switching, the memory circuit continues to provide the value of the last-provided error voltage for the servo system.

After a period of time, which may be of the order of several seconds and can easily be controlled in the invention, an electronic switch, which also acts as an amplitude limiting device, slowly opens and permits the newly selected signal to slowly add or subtract with the remembered voltage to cause a smooth change from the previous signal (remembered voltage) to the new signal. This change can be made over a relatively long period, such as for example, five to ten seconds although the period can be easily altered according to the particular application of the invention.

Further objects, features and advantages of this invention will be apparent to a person skilled in the art after study of the specification and drawings, in which.

Figure 1:
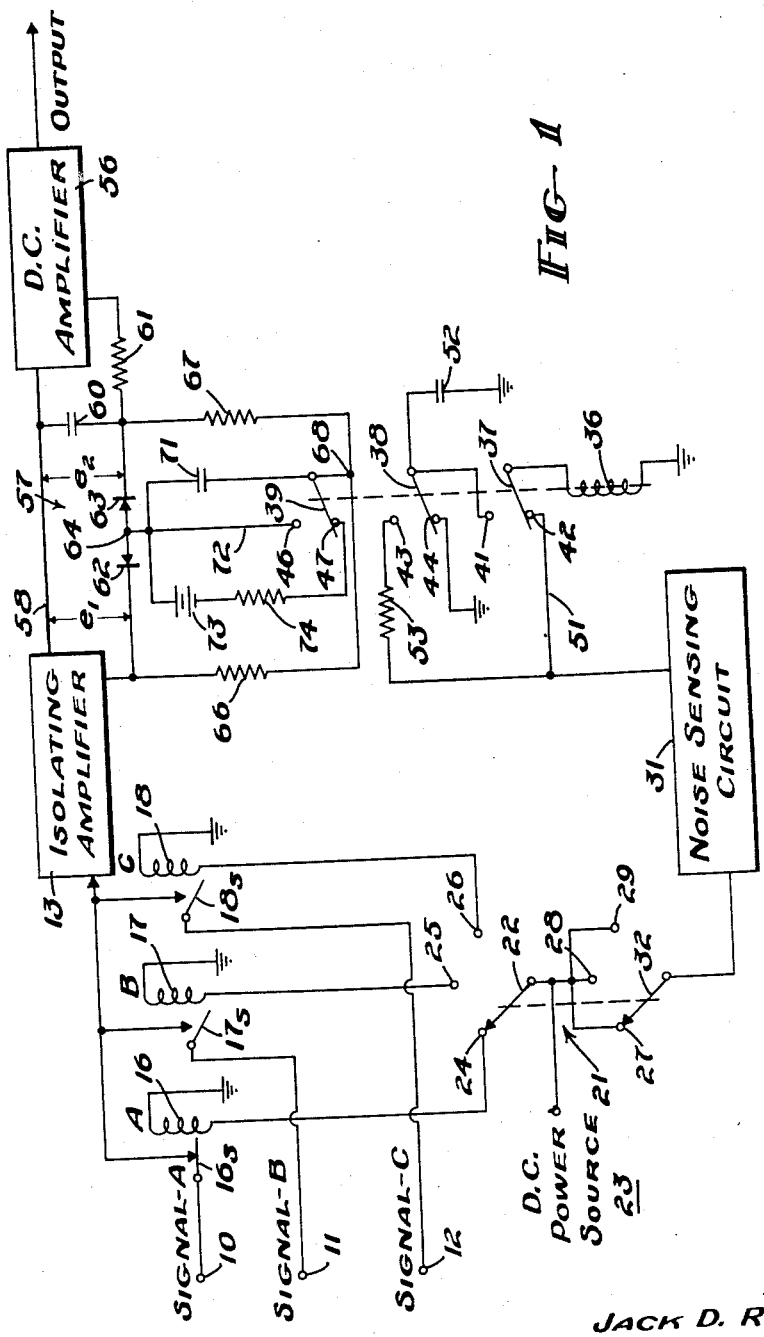
Figure 1 shows an illustrative form of the invention.

Now referring to the invention in more detail, terminals 10, 11 and 12 are respectively connected to plural sources of signals A, B and C. These signals may be related, or they may be completely independent of each other; and for the purposes of this embodiment, it will be assumed that they are totally independent of each other. Signals A, B and C may be either A.C. or D.C. signals which for example might be provided from the outputs of a gyroscope, an omnirange radio receiver, and a glide-slope receiver, respectively.

Any of the three signals may be connected to the input of an isolating amplifier 13 by one of the respective relays 16, 17 and 18. Each relay operates a single-pole single-throw switch. Thus, the relay switch 16s of relay 16 connects terminal 10 to the input of amplifier 13; the relay switch 17s of relay 17 connects second terminal 11 to the input of amplifier 13, and the relay switch 18s of relay 18 connects third terminal 12 to the input of amplifier 13. When the input signal is D.C., isolation amplifier 13 is a D.C. amplifier; and when the input signal is A.C., isolation amplifier 13 is an A.C. to D.C. converter. Amplifier 13 preferably has a low output impedance.

A double-pole three-throw switch 21 is provided, which has one of its poles 22 connected to a direct-current power source 23. Contacts 24, 25 and 26 are sequentially engageable by pole 22, and they connect serially with relays 16, 17 and 18. Each of the relays has its opposite end connected to ground. Thus, any of the signals A, B or C may be connected to the input to amplifier 13 by operating switch 21.

The remaining contacts 27, 28 and 29 of switch 21 are all connected to D.C. power source 23.

A noise-sensor circuit 31 is serially connected to second pole 32 of switch 21. Noise sensor circuit 31 is normally closed; that is, it normally presents a very low resistance between its input and output terminals.

Noise sensor circuit 31 may operate in the manner of a squelch circuit. It will determine when any of the signals A, B or C are non-intelligible, as for example, occurs while the radio receiver providing signal B is being tuned, or while bursts of noise occur which make the connected signal unintelligible. Therefore, noise sensor circuit 31 can provide an open circuit between its terminals during periods that the connected signal becomes unintelligible.

A fourth relay 36 is provided which has three poles 37, 38 and 39, each having respective pairs of double-throw contacts 41 and 42, 43 and 44, and 46 and 47. Relay 36 has one end connected to ground and its other end connected to its poles 37. When pole 37 engages its contact 42, it is connected serially by a lead 51 and noise-sensor circuit 31 to pole 32 of switch 21.

Second pole 38 is connected to the other contact 41, which is engageable by first pole 37. A first capacitor 52 is connected between ground and second pole 38. A resistor 53 connects between the noise sensor circuit 31 and contact 43, that is engageable by pole 38. The other contact 44, which is engageable by pole 38, is connected to ground.

A D.C. amplifier 56 provides the output of the embodiment of the invention shown in Figure 1. Its input signal is provided from the output of isolating amplifier 13, after the signal passes through a special type of switching circuit 57, which obtains the fading operation of the invention. A lead 58 connects between one output terminal of isolating amplifier 13 and one input terminal of D.C. amplifier 56.

A resistor 61 connects at one end to the other input terminal of D.C. amplifier 56. A capacitor 60 is connected between the second end of resistor 61 and the first input terminal of D.C. amplifier 56. A pair of diodes 62 and 63 are serially connected with opposite polarity between the second end of resistor 61 and the other output terminal of isolating amplifier 13. A point 64 is located between diodes 62 and 63.

A pair of resistors 66 and 67 are also connected serially between the second end of resistor 61 and the second output terminal of isolating amplifier 13. A point 68 is located between resistors 66 and 67. Resistors 66 and 67 each have large resistance values. A capacitor 71 is connected between points 64 and 68.

The third pole 39 of relay 36 is connected to point 68. A lead 72 connects between point 64 and one contact 46, which is engageable by pole 39. Furthermore, a battery 73 and a current-limiting resistor 74 are connected between point 64 and the other contact 47, that is engageable by a third pole 39.

Figure 2:
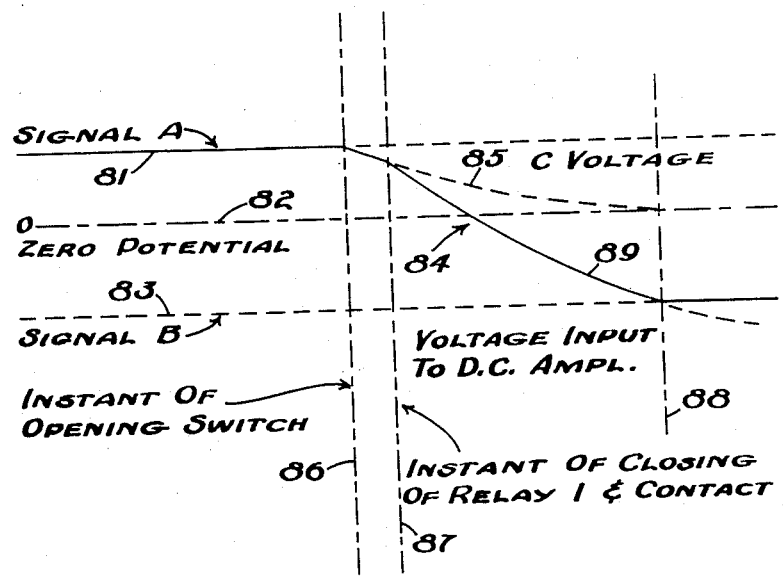
Figure 2 is used to explain the operation of the invention.

Figure 2 illustrates how a relatively smooth transition may be obtained between two very different direct-voltage signals. A line 81, which is solid in part and dashed in part, illustrates signal A; that is presumed in this example to have a positive polarity with a value indicated by its amplitude from zero potential line 82, shown in dashed lines. Reference line 82, in broken lines, signifies ground potential in the invention.

Signal B is illustrated by line 83 which also is dotted in part and solid in part. It has a negative polarity in the illustration of Figure 2.

The output of D.C. amplifier 56 is represented by heavy line 84 (with a gain factor) in Figure 2.

The example of operation will explain how a relatively smooth transition, as represented by line 84, may be obtained at the input to D.C. amplifier 56 when switching occurs from positive signal A to negative signal B.

Switch 21 may be manually controlled by an operator of the servo system, which may be a pilot selecting a different function for an autopilot. It is assumed that poles 22 and 32 of switch 21 are initially engaging contacts 24 and 27, which connect signal A to the system. Let it now be supposed that poles 22 and 32 are manually moved to contacts 25 and 28. Relay 16 will immediately be de-energized to disengage signal A from the input of isolating amplifier 13; and the second relay 17 will very soon be energized to connect signal B to the input of isolating amplifier 13.

Thus, signal B will replace signal A at the input to isolating amplifier 13, after the very short amount of time, which is necessary to manually disengage poles 22 and 32 from one set of contacts and engage them with another set. This amount of time will vary with the manual operator but generally may be from one-tenth to two seconds. This amount of time has no effect upon the output of D.C. amplifier 56 because of this invention. The invention may easily be designed to encompass smaller or greater lengths of time for manual switching.

During the interim that poles 22 and 32 are being manually moved from one set of contacts to another, the D.C. power from source 23 to relay 36 is interrupted. The three poles of relay 36 are normally in the position shown in Figure 1, which is when relay 36 is energized. However, when relay 36 is interrupted, the three poles engage their opposite contacts, as soon as the inductive voltage in the relay 36 drops, which occurs very quickly.

Thus, after manually-operated pole 32 engages contact 28, the poles of relay 36 will be in an upward position in Figure 1. At that instant, a current path will be provided from D.C. source 23 through pole 32, noise sensor circuit 31, resistor 53, contact 43 to pole 38. Also at this time, relay 36 is serially connected to pole 38 through contact 41. However, capacitor 52 is also serially connected to pole 33, and it will charge at the rate depending upon the time-constant provided by resistor 53 and capacitor 52. This time-constant will generally be of intermediate length, as for example one-half second. Thus, it will take relay 36 approximately one-half second after manually-operated pole 32 engages contact 28 before relay 36 has sufficient voltage applied to it by means of capacitor 52 to cause relay 36 to pull in and move its three poles in a downward position in Figure 1.

Furthermore, when relay 36 was de-energized, its third pole 39 engaged contact 46 which connected lead 72 between points 64 and 68 to open the circuit of battery 73, instantly discharge capacitor 71, and thereby cause zero bias on each of diodes 62 and 63; since they now have resistors 66 and 67 respectively connected across them.

Accordingly, diodes 62 and 63 are immediately provided with zero bias when relay 36 opens.

As a result of the zero bias, no signal can pass from the output of isolating amplifier 13 to the input of D.C. amplifier 56 because either polarity of signal from isolating amplifier 13 will be blocked by the back impedance of one of the diodes, since they are connected with opposite polarity. Also resistors 66 and 67 are of such high values that negligible signal current is conducted through them.

Consequently, signal A is interrupted as an input to D.C. amplifier 56 at substantially the instant that manual switch 21 is moved from contact 24. This instant is shown in Figure 2 by broken vertical line 86. And, after pole 22 engages contact 25 to connect signal B to the input of isolating amplifier 13, signal B still cannot reach D.C. amplifier 56 because of the substantially open circuit provided by diodes 62 and 63.

Capacitor 60 was charged to the last value of signal A when it was discontinued. At the instant that diodes 62 and 63 are open-circuited, capacitor 60 and resistor 61 remain serially connected to the input to D.C. amplifier 56, and capacitor 60 retains a charge that, in effect, remembers the last value of signal A at the instant that it was removed. Capacitor 60 and resistor 61 have a very long time constant; and therefore, capacitor 60 substantially retains its charge throughout the time that diodes 62 and 63 disconnect it from isolating amplifier 13.

Line 85, partly solid and partly dashed, in Figure 2 illustrates the discharge characteristic of capacitor 60. The part of line 85, shown in solid line between vertical dashed lines 86 and 87, illustrates the input provided to D.C. amplifier 56 between the instant 86 (at the opening of the diodes due to the manual operation of switch 21) and the instant 87 (at the closing of relay 36). This period was mentioned above to be approximately one-half second due to the time-constant of resistor 53 and capacitor 52.

At the instant of energization of relay 36, its pole 39 will engage contact 47, which will connect D.C. power source 73 between points 64 and 68. Power source 73 will bias diodes 62 and 63 in a conducting manner. However, capacitor 71, which is initially in a discharged state, and large valued resistors 66 and 67 will be connected to biasing source 73, when contact 47 is engaged. Thus, the bias on diodes 62 and 63, which is the voltage across capacitor 71, is not applied instantly at the full value of source 73, but due to the long time-constant of capacitor 71 and its serially connected resistors, which may be for example three or four seconds, the bias on diodes 62 and 63 will slowly rise from zero to the voltage of source 73 over this period.

Due to the slow rise of bias for diodes 62 and 63, a proportional amplitude-limiting action occurs with the signal provided from the output of isolating amplifier 13 before that signal can reach capacitor 60. The amplitude-limiting action occurs with any polarity that the signal may have, due to the opposite polarity of connection for diodes 62 and 63. Consequently, the slowly rising current, due to signal B, applied to capacitor 60 varies its charged voltage from the remembered positive voltage of signal A at instant 86 to the negative voltage of signal B at instant 88. This change of charged voltage on capacitor 60 is indicated by solid line portion 89 in Figure 2.

Capacitor 60 will receive a charge as long as the changing bias on the diodes is less than the value of signal B. As soon as the diode bias exceeds the value of signal B, no further change occurs to capacitor 60; and it will have a charge which is proportional only to signal B indicated by the solid portion of line 83 in Figure 2. Hence, D.C. source 73 should provide an electromotive force that exceeds the maximum value of the output signal from isolating amplifier 13.

When the full bias is restored to diodes 62 and 63, the time-constant associated with capacitor 60 is changed to a relatively short time-constant because the closed condition of diodes 62 and 63 now connects the low-resistance output impedance of isolating amplifier 13 across capacitor 60. Therefore, fast variations of the input signal (which are not switching transients) can reach D.C. amplifier 56.

It can, therefore, be observed that the voltage at the input to D.C. amplifier 56 varies according to solid line 84 in Figure 2; and the output of D.C. amplifier 56 will be proportional to its input. It is, therefore, noted that there is no sharp or sudden transition between signals A and B at the output of D.C. amplifier 56 during the switching process. Accordingly, when an aircraft autopilot is controlled by such output, there is no lurching effect on the attitude of the aircraft caused by switching transients.

It makes no difference in the operation of the invention whether signal B is positive or negative or whether any other input signal is positive or negative. A substantially smooth transition occurs in any case and can be explained with the same type of analysis as described above.

Any number of inputs can be controlled by the invention. It is only necessary that input terminals, such as 10, at least be equal in number to the number of input signals, and that double-pole switch 21 have at least as many contacts.

In switching from signal A to signal C, there is no undesirable effect in temporarily connecting signal B in the switching transition caused at manual switch 21 because during this temporary connection of the unwanted signal, relay 36 is open due to capacitor 52; and therefore, diodes 62 and 63 are open to prevent any of the unwanted signal from reaching D.C. amplifier 56.

The input relays 16, 17 and 18 are provided in order to remotely locate manual switch 21 from the signal input terminals 10, 11 and 12. If remote control is not necessary, an extra pair of poles and set of contacts could be provided with switch 21 to replace switches 16s, 17s and 18s in order to sequentially connect the desired signal input to isolating amplifier 13.

While particular forms of the invention have been shown and described, it is to be understood that the invention is capable of many modifications. For example, vacuum tube, diode or transistor switches can be used to replace the relays in the invention. Changes, therefore, in construction and arrangement may be made without departing from the scope of the invention as given by the appended claims.

I claim:

1. A system for fading one signal into another signal comprising means for selectively switching between said signals, an isolating amplifier receiving the selected signal, a D.C. amplifier, a capacitor and a resistor together having a long time-constant connected serially across the input to said D.C. amplifier, one end of said capacitor connected to one side of the output of said isolating amplifier, a pair of diodes connected serially with opposite polarity between the other side of the output of said isolating amplifier and the other end of said capacitor, means for biasing said diodes to a conducting state, means for removing said bias simultaneously with the switching of one of said signals, and means for slowly reapplying said bias after said switching has occurred.

2. Means for switching among plural signals without transient effects comprising an isolation amplifier first switching means for selectively connecting one of said plural signals to the input of said isolation amplifier second switching means operated in response to said first switching means, a D.C. amplifier, a first capacitor and a first resistor connected in series across the input to said D.C. amplifier, a pair of diodes connected serially with said first capacitor and with the output of said isolating amplifier, said diodes connected with opposite series polarity, means for biasing said diodes to a conducting state, and connected in series with said second switching means, a second capacitor and a second resistor serially associated with said biasing means, and means for instantly discharging said second capacitor also connected in series with said second switching means, said discharging means and said biasing means oppositely connected by said second switching means with respect to said second capacitor, with said discharging means only connected during operation of said first switching means.

3. Means for switching among plural signals without transients occurring at the output of a D.C. amplifier comprising a first capacitor and a first resistor connected serially across the input to said D.C. amplifier and having a long time constant, an isolation amplifier having one output terminal connected to one side of said first capacitor, a pair of diodes connected with opposite polarity between the other output terminal of said isolation amplifier and the other side of said first capacitor, a pair of resistors serially connected across said diodes with each resistor having a large resistance value, a single-pole double-throw switch having its pole connected intermediate said resistors, a D.C. power source connected serially between one side of said switch and a point intermediate said pair of resistors, a lead connected between the opposite side of said switch and the point between said diodes, a second capacitor connected between the point intermediate said diodes and the point intermediate said pair of resistors and having a long time constant with said pair of resistors, switching means for selectively connecting said plural signals to the input of said isolation amplifier, and means for actuating said second switch to engage said lead momentarily upon operation of said switching means.

4. Means for switching among plural signals without transients occurring at the output of a D.C. signal amplifier comprising an isolating amplifier, switching means for selectively connecting said plural signals to the input of said isolating amplifier, a relay having at least single-pole double-throw contacts, with said relay actuated during switching of said plural signals by said switching means, a first capacitor and a first resistor connected serially across the input to said D.C. signal amplifier and having a long time constant, a pair of diodes serially connected with opposite polarity between one side of said capacitor and one output terminal of said isolating amplifier with its other output terminal connected to the other side of said first capacitor, a pair of resistors each having a large resistance value connected in series across said diodes, the pole of said relay connected between said pair of resistors, a second capacitor connected between said pole and a point common to said diodes and having a long time constant with said pair of resistors, a shorting lead connected between said point and one side of said switch, and a biasing source serially connected between said point and the opposite side of said switch.

5. Means for enabling a smooth transition between randomly selected signals at the output of a D.C. signal amplifier comprising an isolating amplifier having a low output impedance and a pair of output terminals, switching means for selectively connecting said plural signals to the input of said isolating amplifier, a power source, a relay having at least single-pole double-throw contacts, a switch connected serially with said power source and said relay, with said switch connecting said source to said relay while said switching means connects one of said signals to said isolating amplifier, and with said switch disconnecting said source from said relay during switching by said switching means, a first capacitor and a first resistor serially connected across the input to said D.C. signal amplifier and having a long time constant, a pair of diodes serially connected with opposite polarity between one side of said capacitor and one output terminal of said isolating amplifier, with its other output terminal connected to the other side of said first capacitor, a pair of resistors each having a large resistance value connected in series across said diodes, the pole of said relay connected between said pair of resistors, a second capacitor connected between said pole and a point common to said diodes and having a long time constant with respect to said pair of resistors, a shorting lead connected between said point and one side of said double-throw contacts, and a biasing source serially connected between said point and the opposite of said double-throw contacts.

6. Means for switching among plural signals without transients occurrnig at the output of a D.C. signal amplifier comprising an isolation amplifier having a low output impedance and a pair of output terminals, switching means for selectively connecting said plural signals to the input of said isolating amplifier, a power source, a relay having three poles, with each pole having double-throw contacts, each of said poles normally engaging one of its contacts when said relay is energized and its other contact when said relay is de-energized, a second switching means connected serially with said power source and said relay, a resistor connected in series between the normally non-engaged contact of said second pole and the power source, with the normally engaged contact of said second pole connected to ground, the normally engaged contact of said first pole connected to the second pole, with the normally non-engaged contact of said second pole connected in series with said second switching means and said power source, the coil of said relay being connected between ground and the first pole of said relay, a first capacitor being connected between ground and the second pole of said relay, said second switching means being normally closed but opening only when said first switching means is actuated to connect another signal, a first capacitor and a first resistor serially connected across the input to the D.C. signal amplifier and having a long time constant, a pair of diodes serially connected with opposite polarity between one side of said first capacitor and one output terminal of said isolation amplifier, with its other terminal connected to the other side of said first capacitor, a pair of resistors each having large resistance value serially connected across said diodes, the third pole of said relay connected between said resistors, a third capacitor connected between said third pole and a point common to said diodes and having a long time constant with said pair of resistors, a shorting lead connected between said point and the normally-open contact of said third pole, and a biasing source serially connected between said point and the normally-closed contact of said third pole.

7. Means for switching among plural signals without transients occurring at the output of a D.C. amplifier comprising an isolating amplifier having a low output impedance and a pair of output terminals, a control switch having at least two poles and a different set of contacts for each pole, with each set having at least as many contacts as there are plural signals, a power source connected to one of said poles and to the set of contacts engaged by said other pole, a plurality of relays respectively connected in series with the contacts in the set engaged by said first pole, the respective contacts of said plural relays connecting said plural signals respectively to the input of said isolation amplifier, a noise sensor circuit connected in series with said second pole, a transition relay including first, second and third poles, each having double-throw contacts with one normally-engaged when said relay is energized, the coil of said transition relay connected between ground and its first pole, with the normally-engaged contact of its first pole being connected in series with said noise sensor circuit, and its opposite contact being connected to its second pole, the normally-engaged contact of said second pole being connected to ground, a first resistor connected in series with the opposite contact of said second pole and said noise sensor circuit, a delay capacitor connected between ground and said second pole, a memory capacitor and resistor connected in series across the input to said D.C. amplifier, one side of said memory capacitor connected to one terminal of said isolating amplifier, a pair of diodes serially connected with opposite polarity between the other terminal of said isolating amplifier and the other side of said memory capacitor, a pair of resistors each having a large resistance value connected serially across said diodes, the third pole of said relay connected between said pair of resistors, a lead connected between the normally-non-engaged contact of said third pole and a point intermediate said diodes, a biasing power source connected between the opposite contact of said third pole and the common point between said diodes, and a third capacitor connected between the common point of said diodes and said third pole.

No references cited.